United States Patent [19]

Stoll et al.

[11] Patent Number: 4,507,345
[45] Date of Patent: Mar. 26, 1985

[54] ADAPTER FORMED FROM A COMPOSITE FOAMED ADAPTER BLOCK HAVING FLUID CHANNELS AND A PROCESS FOR ITS MANUFACTURE

[76] Inventors: Kurt Stoll, Lenzhalde 72, 7300 Esslingen, Fed. Rep. of Germany; Hans-Heinrich Glättli, Seestrasse 252, CH-8700 Küsnacht, Switzerland

[21] Appl. No.: 385,245

[22] Filed: Jun. 4, 1982

[30] Foreign Application Priority Data

Jun. 19, 1981 [DE] Fed. Rep. of Germany ....... 3124020

[51] Int. Cl.³ .................... B29D 27/00; B32B 5/18
[52] U.S. Cl. ..................... 428/137; 156/153; 249/177; 264/45.5; 264/321; 264/DIG. 83; 285/137 R; 428/304.4
[58] Field of Search .................... 264/45.5, 46.6, 46.4, 264/321, DIG. 83; 249/177; 285/137 R; 156/153

[56] References Cited

U.S. PATENT DOCUMENTS

| | | | |
|---|---|---|---|
| 3,381,999 | 5/1968 | Steere, Jr. | 264/46.6 X |
| 3,561,181 | 2/1971 | Bassett | 249/177 X |
| 3,820,828 | 6/1974 | Fiddler | 285/137 R |
| 3,925,526 | 12/1975 | Haas | 264/45.5 |
| 3,993,379 | 1/1976 | Pontigny | 285/137 R X |
| 4,125,280 | 11/1978 | Kuzel | 285/137 R |
| 4,208,368 | 6/1980 | Egli | 264/45.5 |

FOREIGN PATENT DOCUMENTS

| | | | |
|---|---|---|---|
| 404939 | 5/1965 | Australia | 264/45.5 |
| 6270 | 1/1980 | European Pat. Off. | |

OTHER PUBLICATIONS

Stedfeld, Robert; "Where's the Fizz in Structural Foam?"; *Materials Engineering*, Jul. 1978, pp. 20-26.

*Primary Examiner*—Philip Anderson
*Attorney, Agent, or Firm*—Flynn, Thiel, Boutell & Tanis

[57] ABSTRACT

An adapter block having connection openings provided in and extending normal to a surface thereof is produced by a process which includes the steps of foaming a resin compound such as a polyurethane in a mold cavity which has a shape complementary to the adapter block, the resulting component having an integral skin on the exterior surfaces thereof; then allowing the component to harden; then machining the integral skin off the mentioned surface and a surface on the opposite side of the component; and then applying an adhesive to and placing further components against the machined surfaces so that the further components become secured to the first-mentioned component.

10 Claims, 3 Drawing Figures

U.S. Patent  Mar. 26, 1985  4,507,345

ADAPTER FORMED FROM A COMPOSITE FOAMED ADAPTER BLOCK HAVING FLUID CHANNELS AND A PROCESS FOR ITS MANUFACTURE

FIELD OF THE INVENTION

The present invention relates to a process and a foam material mold for producing adapter blocks having channels in one outer face thereof, for carrying fluid under pressure, and connection holes running normal to this outer face.

BACKGROUND OF THE INVENTION

Multiple connection plugs are coming to be used on an ever-increasing scale for producing connections between fluid-powered units, fluid supplies and fluid receivers and furthermore for producing connections between fluid logic circuits and sensors and loads used therewith. Such multiple connection plugs are standardized. One useful effect of them is that they take up little space while on the other hand there is less danger of producing a wrong connection in comparison with systems in which separate fluid lines are used.

For producing a connection between standard fluid terminals of connection plugs and the separate, different fluid terminals of the active and passive fluid components, the special geometry and connection position of such components are taken into account by using adapter blocks. Such adapter blocks have fluid connections or terminals on one connection face at standard points while on their other face, opposite thereto, they have connection openings or terminals in line with the geometry of the component used therewith. Between these two faces there are channels in the adapter block for producing the desired connections, such channels more specially being open and uncovered at the face of the adapter block so that the channels have to be covered over by, and fixed tightly against, the component to be worked through the channels, that is to say so that such channels, which in the first place are open on one side, are covered over and in the form of complete ducts.

So far in the prior art, such adapter blocks have been high in price to make. If only a small quantity is produced, the holes of the open channels are produced by machining a solid block of material (as a rule, a thermoplastic or thermosetting resin). Such machining does, however, take many man-hours and require expensive machining systems because of the mechanical properties of the resins used; furthermore, the inner faces or lining faces of the channels are generally rough.

Furthermore, such adapter blocks may only be economically produced by injection molding if large production runs are needed, this being because of the high price of injection molds. Furthermore, if a thermosetting resin is used, a heavy press is needed for shutting the injection mold, and any further machining which may be necessary after molding, for example because of a very complex channel geometry, would be high in price, and the brittle material is likely to be broken. If, on the other hand, a thermoplastic material is used, there is on the hand the shortcoming of uneven shrinkage and furthermore any after-machining which may be necessary is hard to undertake because of the material's being tough.

SUMMARY OF THE INVENTION

For this reason, one purpose of the present invention is that of making it possible for precision-quality adapter blocks having channels in one outer face thereof and connection holes normal thereto to be produced economically even in small production runs.

For effecting this purpose, and further purposes, in the present invention an integral skin foam compound is placed in a negative or complementary mold of the adapter block, foaming of the compound is caused to make a molding with an integral skin, and after the molding has become hard and/or cured, the connection face, having channels therein, of the adapter block molding and the opposite connection face of the block are levelled off by machining. A foaming mold for undertaking the process may have a first mold end part with negative molds for the outer face channels of the adapter block, a second mold end part with pockets for mold pins representative of the complement of the connection holes of the desired adapter block, mold pins seated in the second mold end part, and a frame-like inbetween part which may be gripped fluid-tightly between the two mold end parts.

Although integral skin foam resin has been widely used for producing a number of different components, it has so far not been used for making pneumatic or hydraulic components. However, it has now been seen, as part of the development of the present invention, that an integral skin foam material has those special properties which make it right for producing adapter blocks, namely because a strong and smooth skin is produced on the mold inner faces so that there is an untroubled, laminar fluid flow over the inner faces of the channels, such smoothness stopping the building up of coatings of dirt on the channel walls. Because this is so, there is no undesired drop in pressure and undesired delay in the fluid pressure signals passing through the adapter block.

On the other hand, on machining the connection faces, the outer face then produced will have a cut-open pore structure so that such an outer face may be used for producing a good joint when placed against the outer face of a component, even if such further outer face is rough. Furthermore, a very high-quality adhesive joint may be produced between two such faces. Because of the machining, that is to say mechanical working, of the molding in the process of the invention, any parting material still on the molding which might otherwise have an undesired effect on the adhesive join made with the outer face of the molding will be removed.

Adapter block moldings produced in the process of the present invention have a good mechanical strength, a high shock resistance and a low weight. Furthermore, much less high-price resin is needed than in earlier prior art processes in which the adapter blocks were made of solid material.

Furthermore, in the process of the invention, truly cylindrical connection holes may be produced because integral skin foam moldings do not have to be sloped to make it possible for the moldings to be taken from the mold.

Producing adapter blocks from an integral skin foam material makes a further useful effect inasfar as the pressure inside the mold is generally low and, for this reason, the mold locking system does not have to be designed for a high mold-shutting force. This is a further useful effect in connection with producing adapter blocks in small factories and in small numbers.

Further developments of the invention will be seen in the claims.

As an example of one further possible development of the invention, after machining the adapter block molding, it is joined adhesively to a connection plug part, a further adapter block or a fluid (that is to say air or liquid) component at the machined outer connection faces. This makes possible a very strong mechanical joint at the machined connection faces.

Furthermore, as part of the present process, it is possible for the structure produced by such joining together with adhesive coating to be squeezed by flat platens acting in a direction normal to the plane of the adhesive, at the time at which the adhesive is curing, in order to get the desired size of the adapter block molding in this direction. This is to take up tolerances in components (joined to the adapter block molding) which, in comparison with the molding, are hard and not able to be squeezed. This further development of the invention has the effect of greatly cutting down producing costs inasfar as such hard components no longer have to be made so true to size.

In the case of a foam mold as used in the invention, the functions of the first and second end parts are kept quite separate, the one end part only being used for producing the channels in the outer face of the adapter block molding, while the second end part is responsible, together with the mold pins thereon, only for producing the connection holes.

This gives a specially simple design of the mold, which may readily be changed for producing different sorts of adapter block molding. Upkeep work on the mold is made simpler and the adapter block molding may readily be taken from the mold. Furthermore, the designer is freer in making a selection of the material for the first mold part. Such a material may be tough and somewhat elastic, that is to say a material which will have poor machining properties.

A mold in which the first mold part is made up of elastically giving material makes it possible for the mold pins to be pressed elastically and fully against the material so that there is no chance of any foam compound making its way inbetween the two, forming a flash which would have to be cut off by later machining.

As a still further development of the invention the second end part has the pockets for the mold pins placed at different points on a standard grid, the further pockets in the grid not needed at a given time for taking up molding pins being shut by stoppers whose uncovered outer faces are a small distance short of the inner molding face of the second mold part. Furthermore, the mold pins may have heads which are taken up in counterbored ends of the pin pockets, such counterbored parts being shut off free of play by a support plate placed thereon. Such a design of the mold makes it simpler for it to be matched to the different designs of adapter blocks with different first mold end parts.

As a further development of the invention the ends of the mold pins are hollow so that, even if such ends are not placed truly against the first mold part, the edges of the ends will nevertheless make a fluid-tight join for stopping molding compound from making its way inbetween the ends and the first mold part.

BRIEF DESCRIPTION OF THE DRAWINGS

An account of the invention will now be given using one working example, to be seen in the figures.

DETAILED DESCRIPTION

Figure 1:
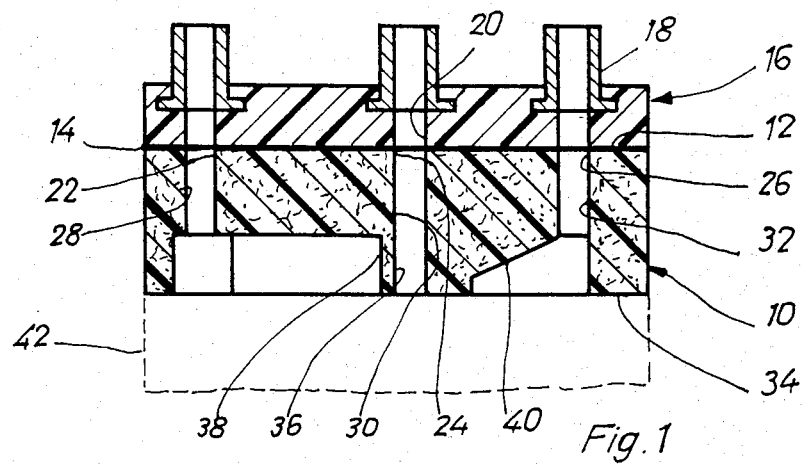
FIG. 1 is a sectional side view of an adapter block made of an integral skin foamed resin, and a connection plug part joined therewith.

In FIG. 1 an adapter block molding, produced from an integral skin material as for example foamed polyurethane, is generally numbered 10. It has a top connection face 12 on which there is an adhesive coating 14 joining it with a standard plug 16 made of resin.

Molded into the standard plug 16 are a number of male metal plug pins 18 which may be plugged into the female connection pockets of a female plug to make a fluid-tight connection. The male plug pins 18 are placed at standard positions on the standard plug 16 and are lined up with fluid channels 20 of the standard plug 16.

The adapter block molding 10 has on its one top connection face 12 an equal number of connection holes 22, 24 and 26 which are lined up with some of the fluid ducts 2o of the standard plug 16. At male pins 18 of the standard plug 16 which are not needed and do not have any fluid connection function, there is no opening in the face 12 so that the fluid duct 20 comes to an end at such face fluid-tightly.

Connection openings 22, 24 and 26 are joined up with holes 28, 30 and 32 of the adapter block molding 10, hole 30 running straight through molding 10 as far as a lower connection face 34 in which it is responsible for forming a connection opening 36.

Connection holes 28 and 32 are placed opening into channels 38 and, in the other case, 40 which are provided in the lower connection face 34 so that there is a connection between such holes 28 and 32 and a pneumatic component 42 which is only marked roughly in broken lines and which is fluid-tightly and adhesively joined with the lower connection face 34 of adapter block molding 10.

Block molding 10 is made of polyurethane hard foam with an integral skin. It is produced by foaming liquid compound in a foaming mold for producing the connection holes and the channels, the walls of such channels being in fact produced with a dense, smooth skin of the molding resin. At such connection faces 12 and 34 such resin skin is taken off by machining such faces along level planes after the molding has been taken from the mold.

Figure 2:
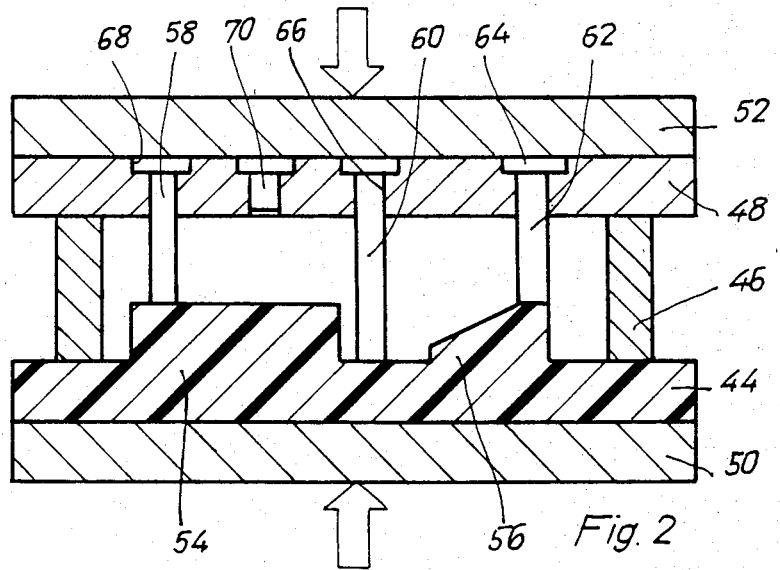
FIG. 2 is a sectional side view of a mold for producing an adapter block as in FIG. 1 by foaming a molding compound.

A foaming mold as presented in FIG. 2 for producing the adapter block molding 10 has as its main part a lower mold end part 44, an inbetween frame 46 of aluminum and which is shut off on all sides, a top mold part 48, and lower and upper platens 50 and 52.

The lower mold end part 44 is produced by casting using a positive pattern of the lower side of the adapter block, which only has the channels, the mold part 44 being made of somewhat giving or elastic resin. For this reason, the lower mold end part 44 has lips or inward projections 54, 56 representative of channels 38 and 40. For molding out the connection holes 28, 30 and 32 there are cylindrical mold pins 58, 60 and 62, each having a top head 64. The mold pins 58, 60 and 62 are seated in pockets 66 of the top mold part 48 with a sliding fit. Pockets 66 are counterbored at 68 to take up heads 64.

The top mold end part 48 has pockets at all points at which, for different adapter blocks, connection holes may be desired, that is to say at the points of standard plugs. Those pockets 66 which are not needed for producing one given sort of adapter block molding 10 are shut off by stoppers 70 whose free end face is at a small distance from the general outline of the inner face of the top mold part 48.

By the use of the top platen 52 the mold pins and stoppers have their heads fixed and kept in the counterbored parts 68 without any axial play, the lower platen 50 supporting the lower mold end part 44, which is elastically giving to a certain degree, when foaming of the polyurethane compound is taking place within the mold. The forces needed for keeping the mold shut are marked by arrows diagrammatically in FIG. 2. These forces are, however, in all so small that only simple mold shutting structures are needed, that is to say the molding operation may be undertaken without a press.

Figure 3:
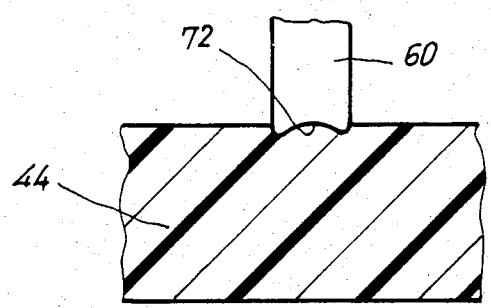
FIG. 3 is a fragmentary sectional side view of a part of the lower mold end part of the mold to be seen in FIG. 2 with a mold pin elastically forced thereagainst.

As may be seen from FIG. 3 the mold pins, as for example mold pin 60, have a hollow end face 72 so that there is a sort of skirt or lip round the lower end of the mold pin which may be forced into the elastically giving material of the lower mold end to make certain that no foaming material will make its way into a position between the lower end of the mold pin and the opposite face of the lower mold end part 44.

For producing adapter block moldings of a given sort, it will only be necessary for mold pins of the desired length to be placed at the desired points in the top mold end part 48 while the other pockets 66 are shut off with stoppers 70. After this preparation, the mold end part 48 may be used together with its inbetween frame 46 and its lower mold end part 44.

For producing a block molding, the inner mold faces are sprayed with a parting material and then the polyurethane mixed foam compound is forced into the mold, which is then shut, the worker then waiting till the material inside the mold has completely filled up the space within the mold and has become solid. The mold is then opened and, using ejectors which are not detailed in the figures and which are placed in holes in the top mold end part 48, the completed block molding is forced out of the inbetween frame 46.

After taking the molding from the mold, the top and lower end faces are machined by milling or grinding to make them ready for adhesively sticking them to another component.

From the accounts so far, it will be seen that one purpose of the invention is that of designing a process which may be run with low costs for the mold, manpower, machine and production, while on the other hand making possible simple and strong joining of the separate plates while there is little chance of the starting material being broken, because the material is not brittle.

An important part of the invention is the use of an integral skin foamed resin. Because the pressure inside the mold does not go up to greater than 5 bar, the molds do not have to be very strong and may, for example, be made of aluminum or synthetic resin, a specially important fact being that the negative mold necessary for molding the channels may be produced by casting from a positive mold using a synthetic resin as for example polyurethane with a certain degree of elasticity and with a high impact strength. The use of an integral skin foam is responsible for a dense and smooth outer face which is no attraction for dirt in the air or other fluid going through the molding in later use with low wall friction and, for this reason, drops in pressure, are not produced. Foamed resin plates have a very much lower modulus of elasticity than solid thermosetting plates and, for this reason, when in the press used for adhesive joining, readily take up any tolerances in the parts with which they are joined to make it possible for structures to be taken out of the mold without any pulling force. On grinding the outer faces of the separate integral skin foam resin plates a solid layer or skin is removed so that a large number of pores will be opened up. At the same time any parting material which is still on the face of the molding and which otherwise might have undesired effects on the adhesive joint produced together with dust produced on grinding is removed. The outer face will in fact be rough, this being a very useful property for the later adhesive sticking operation; in addition to the increase in the surface area, responsible for a sort of interlocking effect, the cut-open pores, which are otherwise still shut off, may take up great amounts of adhesive so that there is less need to keep a careful eye on the amount of adhesive used for producing the adhesive coating. For reasons of mechanical strength and resistance to chemicals while at the same time giving good adhesive properties, the synthetic resin may be more specially a thermosetting integral skin hard foam of polyurethane, although thermoplastic hard foam resins may be used. Plates of synthetic resin made by casting are higher in price, are more brittle, are heavier and they may not be so readily squeezed to take up pore tolerances in other parts with which they are joined, this being because such material does not so readily undergo an elastic and/or plastic change in form. Solid material furthermore has a markedly higher density; putting it differently, more resin is then needed.

A further part of the invention is the special design of the mold used for producing the plates and which is responsible for a further marked decrease in the price of producing the moldings, such decrease in price not being unimportant in the case of small production runs of the order on 20 units. In this respect, once again, one of the special properties of foamed resin is used. The lower part of the mold is made up of two parts, including a cast resin negative for the channels only, that is to say not for the holes through the molding, and an aluminum frame which may be made of different sizes in line with the desired shape of the plates. The top mold part is made up of a plate with holes and a platen used for keeping the pins in position. Using different lower parts, different sizes of plates may be produced. The negative of the lower part is produced from a master or positive. Holes are shut off with the help of, more specially, cylindrical pins. The use of cylindrical in place of conical pins is, generally speaking, only possible with a foam material (which has a generally low modulus of elasticity). The holes running all the way through the molding or from the floor of a channel to the face opposite to the channels are produced by such pins. If at certain points on a grid no hole is needed, a short pin, that is to say a stopper, is placed in the plate 48, such stoppers having a length that is short of, or sticking out from the plate, for example by a distance of 0.1 mm so as to be responsible for forming a low head or pocket in the foam material plate, such a mark being readily machined away on later grinding. Those pins which go as far as the floor of a channel for forming a hole (it being best for all channels to have the same depth) are made so long that when the mold is shut, they are forced firmly against the tops of the negative lips forming the floors of the channels, this being for the purpose of stopping any skin being formed which would make later machining necessary. The pins which are responsible for producing holes all the way through the plate, that is to say the adapter block molding, may once again be made a little shorter or longer than the thickness of the foam resin plate; in the first case, skin or flash is to be produced which is removed by grinding later while in the second case the pins are forced somewhat against and into the negative mold which is made of soft material. For this reason, it is important for the negative mold to be made of a material which may be elastically changed in form even by small forces.

The plate for supporting the pins and ejectors is a special tool. If holes are produced therein in the form of a grid of locations at which holes may be needed at some time through the adapter block molding and extend as far as the floor of a channel, but not in all cases, one and the same tool may be used for foam molding all plates for a certain family of elements up to a certain upper size limit. As special-purpose mold parts, for a given plate, it will only be necessary to have, at the most, the cast channel negative mold and possibly a frame for forming the outer limits of the plate, that is to say if the adapter block, adhesively joined to other parts, is not later to be cut down to the desired size. On opening up the mold, the cylindrical or nearly cylindrical pins have the effect of pulling the molding or foamed resin plate clear of the lips for forming the channel, which have a certain degree of taper in the mold-opening direction.

Lastly, with the mold opened, the foamed resin plate is pushed clear of the mold pins (for producing the holes) by ejector pins. Nextly the ejector pins are pulled back by a pull-back plate.

The block structure to be produced is made by sticking together a number of such plates, which then undergo face-grinding. Particularly high quality blocks with integrated connections are produced by adhesively attaching special assembly plates for the pneumatic elements, which are made of a compact thermosetting material as for example phenol resin, on the channel or connection block. The same process may furthermore be used for connection parts of multi-pin plugs; a useful design in this respect is for example in the form of a multiple bush strip with molded-in holes for taking up plugged-in nipples having U-ring gaskets and which furthermore has threaded bushes or the like taken up in the material.

The embodiments of the invention in which an exclusive property or privilege is claimed are defined as follows:

1. An adapter which is adapted for use in a fluid control system, which includes an adapter block having a fluid channel therethrough, which includes a member adhesively secured to one side of said adapter block, and which is produced by a process comprising the steps of: introducing a quantity of a foamable synthetic resin into a mold cavity having a rod extending therethrough, said quantity of said foamable synthetic resin being sufficient to cause the resulting foam to completely fill said mold cavity; thereafter waiting a first predetermined interval of time while said foamable synthetic resin expands in volume to fill said mold cavity; thereafter waiting a second predetermined interval of time while said foamable synthetic resin solidifies, the portions of said foamable synthetic resin adjacent surfaces of said mold cavity and said rod forming an integral, solid skin around the remainder of said synthetic resin and said remainder forming a foam core, the resulting object being said adapter block and said rod in said mold cavity defining said fluid channel therethrough; thereafter removing said adapter block from said mold cavity; thereafter machining said adapter block on said one side thereof so as to remove said skin from said one side thereof; thereafter applying an adhesive to at least one of a surface of said member and said one side of said adapter block; thereafter placing said surface of said member against said one side of said adapter block; and thereafter waiting a third predetermined interval of time sufficient to permit said adhesive to cure.

2. A process for making an adapter which is adapted for use in a fluid control system and which includes an adapter block and a member which is adhesively secured to one side of said adapter block, said adapter block and said member each having a fluid channel therethrough and said fluid channels being in fluid communication, comprising the steps of fabricating said adapter block from a foamable synthetic material so as to produce a foam core and an integral, solid skin which surrounds said foam core and defines the exterior surfaces of said adapter block and said fluid channel therethrough; thereafter machining said adapter block on said one side thereof so as to remove said skin from said one side thereof; and thereafter adhesively securing said member to said one side of said adapter block so that said fluid channels therein are in fluid communication.

3. The process according to claim 2, wherein said step of fabricating said adapter block includes the steps of introducing into a mold cavity a quantity of said foamable synthetic material, said foamable synthetic material being a foamable synthetic resin and said quantity thereof being sufficient to cause the resulting foam to fill said mold cavity; thereafter waiting a first predetermined interval of time while said foamable synthetic resin expands in volume to fill said mold cavity; thereafter waiting a second predetermined interval of time while said foamable synthetic resin solidifies, the resulting article being said adapter block and said integral, solid skin thereof being formed by the portions of said foamable synthetic resin adjacent the inner surfaces of said mold cavity; and thereafter removing said adapter block from said mold cavity.

4. The process according to claim 3, wherein said step of adhesively securing said member to said one side of said adapter block includes the steps of placing said member against said one side of said adapter block with an adhesive therebetween; thereafter applying compressive forces to said adapter block and said member in directions generally perpendicular to said one side of said adapter block so as to bring the combined width of said adapter block and said member into conformity with a predetermined value; and waiting a third predetermined interval of time while carrying out said step of applying compressive forces, said third predetermined interval of time being sufficient to permit said adhesive to cure.

5. A process for making an adapter which is adapted for use in a fluid control system and which includes an adapter block and a member which is adhesively secured to one side of said adapter block, said adapter block having a fluid channel therethrough, comprising the steps of: introducing a quantity of a foamable synthetic resin into a mold cavity having a rod extending therethrough, said quantity of said foamable synthetic resin being sufficient to cause the resulting foam to completely fill said mold cavity; thereafter waiting a first predetermined interval of time while said foamable synthetic resin expands in volume to fill said mold cavity; thereafter waiting a second predetermined interval of time while said foamable synthetic resin solidifies, the portions of said foamable synthetic resin adjacent surfaces of said mold cavity and said rod forming an integral, solid skin around the remainder of said synthetic resin and said remainder forming a foam core, the resulting object being said adapter block and said rod in said mold cavity defining said fluid channel therethrough; thereafter removing said adapter block from said mold cavity; thereafter machining said adapter block on said one side thereof so as to remove said skin from said one side thereof; thereafter applying an adhesive to at least one of a surface of said member and said one side of said adapter block; thereafter placing said surface of said member against said one side of said adapter block; and thereafter waiting a third predetermined interval of time sufficient to permit said adhesive to cure.

6. The process according to claim 5, including simultaneously with said step of waiting said third predetermined period of time the step of applying compressive forces to said adapter block and said member in directions generally perpendicular to said one side of said adapter block so as to bring the combined width of said adapter block and said member into conformity with a predetermined value.

7. The process according to claim 5, wherein said mold cavity includes means defining an inward projection and wherein one end of said rod engages said projection, said projection producing a channel in a second side of said adapter block generally opposite said one side thereof, and wherein said machining step includes the step of machining said adapter block on said second side thereof so as to remove said skin from said second side thereof.

8. The process according to claim 7, wherein said fluid channel in said adapter communicates with said one side thereof, and including the step of providing a fluid channel in said member which communicates with said fluid channel in said adapter block when said member is adhesively secured to said adapter block.

9. The process according to claim 8, wherein said foamable synthetic resin is a polyurethane.

10. The process according to claim 9, including, immediately prior to said step of introducing said foamable synthetic resin into said mold cavity, the step of applying to the inner surfaces of said cavity a parting material.

* * * * *